US012689911B2

(12) United States Patent
Larsson Forsberg et al.

(10) Patent No.: US 12,689,911 B2
(45) Date of Patent: Jul. 21, 2026

(54) OFFLINE MODELLING OF RADIO BASE STATION ENVIRONMENTS FOR REAL-WORLD DEPLOYMENT

(71) Applicant: Telefonaktiebolaget LM Ericsson (publ), Stockholm (SE)

(72) Inventors: Albin Larsson Forsberg, Täby (SE); Filippo Vannella, Stockholm (SE); Jaeseong Jeong, Solna (SE); Ezeddin Al Hakim, London (GB)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 329 days.

(21) Appl. No.: 18/289,906

(22) PCT Filed: May 21, 2021

(86) PCT No.: PCT/EP2021/063584
§ 371 (c)(1),
(2) Date: Nov. 8, 2023

(87) PCT Pub. No.: WO2022/242872
PCT Pub. Date: Nov. 24, 2022

(65) Prior Publication Data
US 2024/0381112 A1 Nov. 14, 2024

(51) Int. Cl.
*H04W 16/22* (2009.01)
*H04B 17/391* (2015.01)
(Continued)

(52) U.S. Cl.
CPC ........ *H04W 16/18* (2013.01); *H04B 17/3913* (2015.01); *H04W 16/28* (2013.01)

(58) Field of Classification Search
CPC .......... G06N 3/006; G06N 3/02; G06N 3/042; G06N 3/044; G06N 3/0442; G06N 3/045;
(Continued)

(56) References Cited

U.S. PATENT DOCUMENTS 10,632,618 B2 * 4/2020 Pascanu ................. G06N 3/008
2021/0103815 A1 * 4/2021 Jeong ....................... G06N 7/01
(Continued)

OTHER PUBLICATIONS

Fabio et al., Bayesian Domain Randomization for Sim-to-Real Transfer, arXiv, 7 pages, May 18, 2020.*
(Continued)

*Primary Examiner* — Frank Duong
(74) *Attorney, Agent, or Firm* — Weisberg I.P. Law, P.A.

(57) ABSTRACT

Modelling an environment of a radio base station is provided and comprises training a reinforcement learning (RL) agent using a range of representations of an environment of a radio base station, wherein actions taken by the RL agent in the environment to arrive at a policy regarding a radio performance to be obtained for said environment are based on selected tilt angles of at least one antenna of the radio base station, performing an offline evaluation of the trained RL agent using pre-recorded real-world data representing the selected tilt angles and the corresponding obtained radio performance over said range of representations of the environment, determining, from the offline evaluation, if the trained RL agent complies with the pre-recorded real-world data, and if so performing a real-world deployment of the trained RL agent for said range of representations of the environment.

12 Claims, 4 Drawing Sheets

(51) Int. Cl.
    *H04W 16/18*       (2009.01)
    *H04W 16/28*       (2009.01)
(58) Field of Classification Search
    CPC .. G06N 3/0455; G06N 3/0464; G06N 3/0499;
              G06N 3/08; G06N 3/088; G06N 3/09;
              G06N 3/091; G06N 3/092; G06N 7/00;
              G06N 20/00; G06N 20/10; H04B
              17/3912; H04B 17/3913; H04L 25/0254;
              H04L 25/03165; H04L 2012/5686; H04L
              2025/03464; H04L 41/145; H04L 41/16;
              H04L 45/08; H01Q 3/04; H01Q 1/246;
              H04W 24/02; H04W 16/18; H04W 16/22;
                              H04W 16/28
    See application file for complete search history.

(56)               References Cited

U.S. PATENT DOCUMENTS

| | | | |
|---|---|---|---|
| 2022/0147876 A1* | 5/2022 | Dalli | G06N 3/0895 |
| 2022/0248237 A1* | 8/2022 | Hu | H04W 24/08 |
| 2022/0264331 A1* | 8/2022 | Arnott | G06N 3/006 |

OTHER PUBLICATIONS

Andrychowicz, et al., "Learning Dexterous In-Hand Manipulation," International Journal of Robotics Research, vol. 39, Issue 1, Jan. 2020, 33 pages.
Ben-David, et al., "Analysis of Representations for Domain Adaptation," Advances in Neural Information Processing Systems, Dec. 2006, 8 pages.
Dreifuerst, et al., "Optimizing Coverage and Capacity in Cellular Networks using Machine Learning," International Conference on Acoustics, Speech and Signal Processing, Feb. 2021, IEEE, 5 pages.
Gulati, Mayank, "Bridging Sim-to-Real Gap in Offline Reinforcement Learning for Antenna Tilt Control in Cellular Networks," Degree Project in Computer Science and Engineering, KTH Royal Institute of Technology, Jan. 25, 2021, Stockholm, Sweden, 72 pages.
Maggi, Lorenzo, et al., "Bayesian Optimization for Radio Resource Management: Open Loop Power Control," IEEE Journal on Selected Areas in Communications, vol. 39, Issue 7, Jul. 2021, IEEE, pp. 1858-1871.
Rusu, Andrei, et al., "Progressive Neural Networks," Computer Science, Version 4, Oct. 22, 2022, 14 pages.
Schulz, Eric, et al., "A tutorial on Gaussian process regression: Modelling, exploring, and exploiting functions," Journal of Mathematical Psychology, vol. 85, Aug. 2018, Elsevier, Inc., 7 pages.
Shahriari, Bobak, et al., "Taking the Human Out of the Loop: A Review of Bayesian Optimization," Proceedings of the IEEE, vol. 104, Issue 1, Jan. 2016, IEEE, 28 pages.
Tang, Sanli, et al., "Adversarial Attack Type I: Cheat Classifiers by Significant Changes," IEEE Transactions on Pattern Analysis and Machine Intelligence, vol. 43, Issue 3, Jul. 2019, IEEE, 11 pages.
Truong, et al., "Bi-directional Domain Adaptation for Sim2Real Transfer of Embodied Navigation Agents," IEEE Robotics and Automation Letters, Preprint Version, Feb. 2021, 8 pages.
Vannella, et al., "Off-policy Learning for Remote Electrical Tilt Optimization," 92nd Vehicular Technology Conference, May 2020, IEEE, 5 pages.
Vannella, et al., "Remote Electrical Tilt Optimization via Safe Reinforcement Learning," Wireless Communications and Networking Conference, Jan. 2021, IEEE, 7 pages.
International Search Report and Written Opinion for International Patent Application No. PCT/EP2021/063584, mailed Mar. 1, 2022, 12 pages.

* cited by examiner

OFFLINE MODELLING OF RADIO BASE STATION ENVIRONMENTS FOR REAL-WORLD DEPLOYMENT

This application is a 35 U.S.C. § 371 national phase filing of International Application No. PCT/EP2021/063584, filed May 21, 2021, the disclosure of which is incorporated herein by reference in its entirety.

TECHNICAL FIELD

The present disclosure relates to a method of modelling an environment of a radio base station, and a device performing the method.

BACKGROUND

Reinforcement Learning (RL) is a flexible framework that applies data driven optimization to control problems. It is based on an agent's interaction with an environment, where the RL agent visits states of the environment, executes actions, and receives rewards for such actions. Usually, an RL problem is characterized as a Markov Decision Process (MDP), consisting of a tuple $(\mathcal{S}, \mathcal{A}, \mathcal{P}, \gamma, R)$, where $\mathcal{S}$ is the set of all states, $\mathcal{A}$ the set of actions, $\mathcal{P}$ the transition probabilities, $\gamma$ the discount factor, and R the reward function.

The goal of RL is to find a policy $\pi$ that optimizes a value function. The value function is a mapping between the different states and the expected discounted sum of rewards, also known as the expected return. An optimal policy selects actions that lead to a state with the highest expected return.

RL aims to estimate the optimal value function and derive the optimal policy. The optimal policy is found through the agents' interactions. This means that the agent must not only take actions that have high return, but also visit states and take actions that yield low return to explore unknown areas of the environment. Otherwise, the RL agent, also known as the trained RL model, may not constitute a convincing representation of the real-world scenario that it aims to model.

This is an undesired feature in situations where visiting states with low return may be costly or even dangerous when applied in the real world.

SUMMARY

One objective is to solve, or at least mitigate, this problem and thus to provide an improved method of creating and training an RL agent for real-world deployment.

This objective is attained in a first aspect by a method of modelling an environment of a radio base station. The method comprises training a reinforcement learning (RL) agent using a range of representations of an environment of a radio base station, wherein actions taken by the RL agent in the environment to arrive at a policy regarding a radio performance to be obtained for said environment are based on selected tilt angles of at least one antenna of the radio base station, performing an offline evaluation of the trained RL agent using pre-recorded real-world data representing the selected tilt angles and the corresponding obtained radio performance over said range of representations of the environment, determining, from the offline evaluation, if the trained RL agent complies with the pre-recorded real-world data, and if so performing a real-world deployment of the trained RL agent (202) for said range of representations of the environment.

This objective is attained in a second aspect by a device configured to model an environment of a radio base station, said device comprising a processing unit and a memory, said memory containing instructions executable by said processing unit, whereby the device is operative to train an RL agent using a range of representations of an environment of a radio base station, wherein actions taken by the RL agent in the environment to arrive at a policy regarding a radio performance to be obtained for said environment are based on selected tilt angles of at least one antenna of the radio base station, perform an offline evaluation of the trained RL agent using pre-recorded real-world data representing the selected tilt angles and the corresponding obtained radio performance over said range of representations of the environment, determine, from the offline evaluation, if the trained RL agent complies with the pre-recorded real-world data, and if so to perform a real-world deployment of the trained RL agent for said range of representations of the environment.

Thus, an RL agent is created, trained and supplied to a radio base station (RBS) in order to enable for the RBS to estimate different antenna tilt scenarios depending on conditions prevailing in a cell served by the RBS. The RBS will thus advantageously be able to evaluate different scenarios utilizing the trained RL agent and perform antenna tilting indicated by the trained RL agent to be beneficial according to a selected and evaluated measure of radio performance given the particular conditions prevailing in the cell.

If from offline evaluation it is concluded the trained RL agent indeed complies—at least to a sufficiently high degree—with pre-recorded real-world data, the trained RL agent along with parameters defining an environment of the RBS for which the RL agent will be supplied to the RBS, thereby advantageously enabling a real-world deployment of the trained RL agent to be performed in that the RBS will utilize the trained RL agent to determine which antenna tilt to perform under different conditions in order to achieve a desired performance.

In an embodiment the method comprises, when performing an offline evaluation, computing a performance score indicating a measure of compliance of the trained RL agent with the pre-recorded real-world data; and further when determining if the trained RL agent complies with the pre-recorded real-world data, determining if the computed performance score exceeds a compliance threshold value, and if so the real-world deployment of the trained RL agent is performed.

In an embodiment the method comprises, if it is determined from the offline evaluation that the trained RL agent does not comply with the pre-recorded real-world data, performing a Bayesian optimization process on said range of representations of an environment of the radio base station in order to find a different range of representations where the trained RL agent is estimated to better comply with the pre-recorded real-world data, and further training the RL agent using said different range of representations to arrive at a further trained RL agent determined to better comply with the pre-recorded real-world data based on the performed offline evaluation.

In an embodiment the method comprises, when performing a Bayesian optimization (BO) process, evaluating said range of representations of an environment of the radio base station in a gaussian process regression model in order to find a different range of representations where the trained RL agent is estimated to better comply with the pre-recorded real-world data.

In an embodiment the method comprises applying an acquisition function to the data evaluated in the gaussian process regression model in order to find said different range of representations where the trained RL agent is estimated to better comply with the pre-recorded real-world data, the acquisition function determining said different range of representations such that a range is avoided where low reinforcement learning return is expected.

In an embodiment, the acquisition function is applied only to evaluated data being a result of at least one iteration of RL agent training.

In an embodiment, the range of representations of an environment of the radio base station is initially selected randomly from a full range of representations.

Embodiments disclosed herein allows for optimization and tuning of a simulation which enables more successful sim-to-real transfer without the need of training directly on real-world data or deploying the agent to the real world. This is enabled by adapting a source environment to a target environment by carefully choosing simulation parameters. Advantages include:

efficiently combining domain randomization (DR) and domain adaptation (DA) to complement the strengths and weaknesses of each other. A drawback of DR is that it loses in performance efficiency and optimality of solution as the robustness increases. A desired outcome is to randomize the environments to such a degree that passing the reality gap is possible while keeping the performance as high as possible in the target domain. Finding the correct randomization parameters is a challenging problem as it requires many evaluations at different ranges. The training of an RL agent takes a significant amount of time and this renders brute force searching for a good randomization range extremely inefficient. BO sample efficiency tunes the source environment, introducing the DA part to the problem where it adapts the source domain to be better aligned with the target domain, and finds the optimal range for which DR training of an agent yields high performance real-world scores;

employing hands-off random parameter tuning to find good simulation parameters. It eliminates the need of a human intervention in the process since it automatically selects the next function evaluation through the acquisition function. It also starts evaluating a smaller range and converges towards the optima as the number of iterations increases. The only interaction that is needed is in the beginning of the design process, e.g., choosing domain constraints, kernel and mean function, and which parameters to tune. The rest of the of the process is autonomous and needs no interaction;

for the state-action value function to be properly approximated, the return of different state-action pairs needs to be evaluated. This includes state-action pairs where the return is low. It is undesirable for an agent to learn from bad experiences in a live network as the performance will be temporarily low while the agent is exploring new interactions with the live environment. Not relying on real-world rollouts eliminates the risks associated with deploying an agent to the real world; and time efficiency in the sense that several agents can be trained at the same time to work well with the dataset and is not limited to the fact that there is a single network to be deployed to in the real world. Several parameters can be tuned at the same time to see which parameter has the most impact on the performance of the agent's network optimization policy.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

Figure 1:
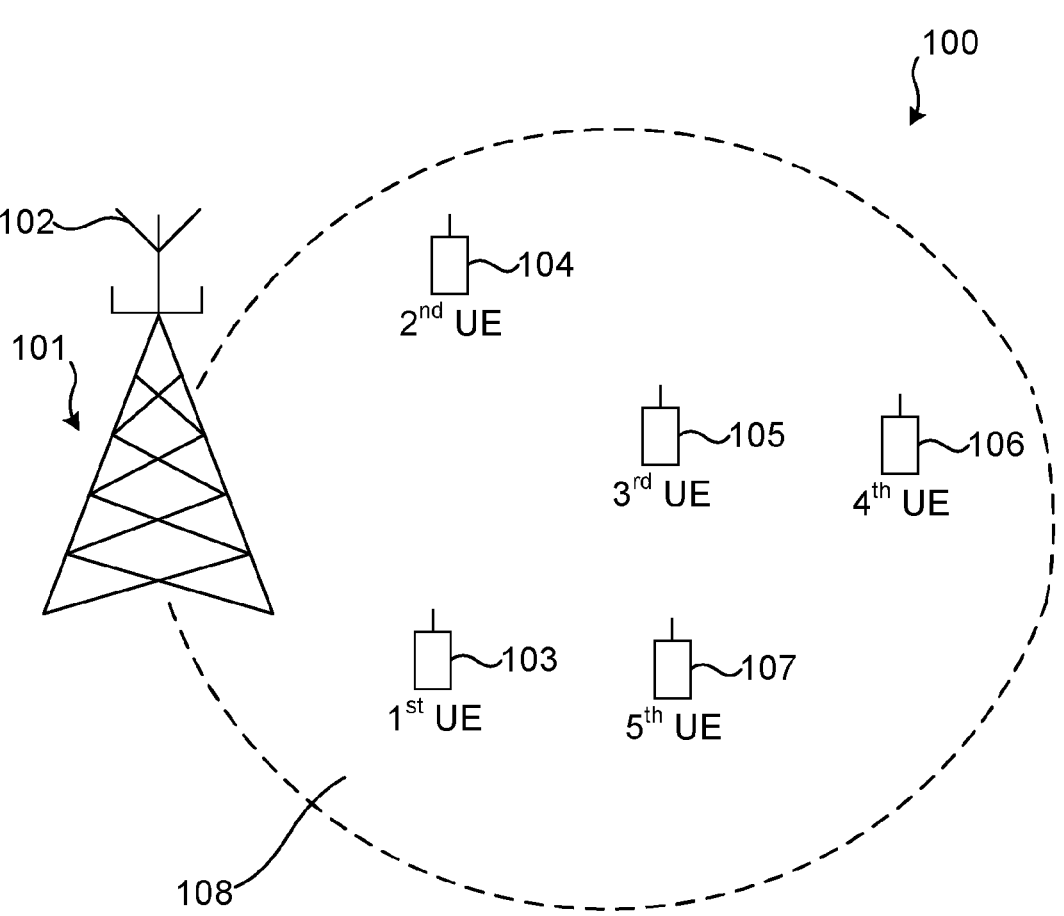
FIG. 1 illustrates a wireless communications network in which embodiments may be implemented.

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

1. The Sim-to-Real Problem

The simulation-to-reality problem, or sim-to-real problem for short, aims at deploying an agent or model trained in simulation to the real world. Deploying an agent directly from the simulator to the real-world environment usually leads to sub-optimal performance and is caused by the so-called reality gap. The reality gap is caused by the hard-to-eliminate model differences between the simulator and real world. These differences could for example be caused by a difference in dynamics in the simulator vs. the real world or simulation artifacts that do not exist in the real world.

The sim-to-real problem has been studied extensively within the field of e.g. robotics, where it has shown great potential for solving complex tasks such as robot movement, robot arm control, and in-hand manipulation. The capabilities of sim-to-real techniques are not limited only to robotics but have also been used to learn how to play computer games, as in the use of progressive networks. Progressive networks have also been used for sim-to-real in network optimization, where a progressive network trained in simulation is extended using adaptor nodes to work in the real world when trained on real-world data.

The objective of sim-to-real methods is to ensure that a policy learnt in the simulation source environment is also effective in the real-world target environment. The exact behaviour of an Artificial Neural Network (ANN) is difficult to predict; a small change in the input vector may lead to a great change in the output, or a large change in the input vector may not result in any change in the output, when a difference indeed is expected.

This can be seen in so-called adversarial attacks against neural networks. These attacks exploit how the networks work. This acts as an example of how sensitive methods based on ANNs are, such as for example Deep Q Networks. This type of sensitivity makes it hard for policies to generalize well to the real world.

The network is tuned to work well within the simulation environment, the agent may learn how to exploit certain features or artefacts present in the simulated environment. Since these are not present in the real world, the transferred agent will not perform as expected when moved to the real world. Solving this problem is crucial in passing the reality gap.

Most approaches in the sim-to-real scope can be categorized in Domain Adaptation (DA) or Domain Randomization (DR). DA approaches aim to solve the problem of adapting how the agent interacts with the target environment to facilitate transfer to the real world. DR aims to randomize the environment where the agent is training so that it covers a wide range of different values and thereby is well-prepared for a real-world environment. The idea is that this approach trains an agent that is robust enough to survive the reality gap transfer.

1.1 Domain Randomization

If a trained ANN model lacks robustness, it may be incapable of dealing with minor changes in the inputs which would lead to unexpected behavior. A way to increase the ANN robustness is to inject noise into the training data so that the network learns to expect small deviations in the input values. Injecting noise in a supervised learning task is performed to cause variations to the environment in which the RL agent/model is trained. For example, changing the different weights of an object that the agent is supposed to move, trains the agent to expect different weights and thus adapt the approach it uses to be able to handle these different types of scenarios.

The idea behind DR is to train the agent across a range of different environments so that the trained agent is robust enough to survive the transfer to the real world. Formally, the goal of DR is to find the optimal network model parameters $\theta^*$ maximizing the expected return $V_\theta(\cdot)$ across a range of environments that are characterized by a probability distribution $\upsilon(\cdot)$. In other words, DR aims at solving the following optimization problem:

$$\theta^* = \underset{\theta \in \mathbb{R}^k}{\mathrm{argmax}}\ \mathbb{E}_{\xi \sim \upsilon(\cdot)}[V_\theta(\xi)].$$

The variables $\xi \in \mathbb{R}^d$, such that $\upsilon$ is a multivariate distribution from which $\xi$ is sampled, where d is the number of simulation parameters sampled from this population per sample. The model parameter $\theta \in \mathbb{R}^k$ represents the variables in the ANN decision making model.

A different DR approach has been used to solve a network optimization problem before, but such method relied on direct training on real data to fit the trained model to the target environment. The present proposed solution does not rely on training on real world data directly, and only uses pre-recorded real world data for evaluation of the policy.

1.1 Domain Adaptation

DA focuses on optimizing the simulation environment in such a way that the learned policy, i.e. the trained agent or model, works within a range of target environments. This type of problem exists when the source environment is different compared to the target environment. This difference in domain is also known as the domain shift problem. Successfully managing to transfer a model trained on one domain to another domain means that the model has adapted to the target. This may occur in situations such as e.g. when a spam filter model trained on a set of users needs to be extended an adapted to work on a new user profile with a different set of emails.

2. Bayesian Optimization

Bayesian Optimization (BO), like other types of optimization methods, aims at optimizing an objective function. Formally, the goal of BO is to find the solution to the following problem:

$$x^* = \underset{x \in \mathbb{R}^N}{\mathrm{argmax}}\ f(x),$$

where x is defined on $\mathbb{R}^N$ and $f$ is a mapping from $\mathbb{R}^N \to \mathbb{R}$.

What makes BO especially interesting is that the objective function is unknown. The only way that the objective function can be optimized is by using pointwise evaluations. A naïve attempt to solve this is to perform a grid-based search to find the optimal value. One drawback of this approach is that it evaluates the function to be optimized over the entire domain, and this makes the optimization sample inefficient.

This is especially important if the objective function is expensive to evaluate. In the most common case, the limiting resource is time, but it could also be because of high cost, limited access to equipment, or limited amount of evaluation attempts. A useful aspect about BO is that it eliminates the need of human intervention and it is a completely autonomous process. A convenient property of BO is that it can be used to solve non-convex optimization problems, since it has no assumption about the shape of the objective function.

2.1 Gaussian Process

Since the objective function is not known within the context of BO, the aim is to replace the objective function with a surrogate function such as a Gaussian Process (GP). Such a surrogate function is defined through a mean and variance function.

The closer two points are the less uncertainty there is regarding the actual value of the function around these points. The GP is a distribution of functions and the surrogate GP is dependent on the posterior information D. It can be modelled as:

$$f(x|D) \sim GP(\mu_D(x), k_D(x, x'))$$

where the function $f$ is parametrized using the mean and kernel function $\mu_D$ and $k_D$.

2.2 Mean and Kernel Function

The mean function, $\mu_D$, describes the expected value of all functions sampled from the GP evaluated at the point x. The kernel function k is a design choice and describes how two points are related to each other. It is also known as the covariance function. The only requirement on the kernel function is that it returns a positive semi-definite matrix $K \in \mathbb{R}^{n \times n}$ where the elements of the matrix are $K_{i,j} = k(x_i, x_j)$. The indices $i, j \in [1, 2, \ldots, n]$ where n is the number of sampled points. The noise level of the measurements is determined by $\sigma^2$. Common choices of kernel functions are the squared exponential function, periodic kernel function, and a family of kernels called the Matérn kernel function. The Matérn kernel functions are written as $$k(x, x') = \sigma^2 \frac{2^{i-\nu}}{\Gamma(\alpha)} \left( \sqrt{2\sigma} \frac{\|x - x'\|_2}{l} \right)^{\nu} K_{\alpha} \left( \sqrt{2\alpha} \frac{\|x - x'\|_2}{l} \right).$$

The value of the kernel functions is close to $\sigma^2$ when the points x and x' are close to each other and decreases as the distance increases. The functionality of the parameter l is a length scale and regulates how fast this decrease is. It serves as a design choice to control how much each point affects its proximity.

The property that points evaluated closer to known points have a higher covariance is sound, as it comes logically that there should be a higher confidence that points evaluated close to each other should have a covariance close to one and decrease is they are evaluated further away. The Matérn kernel works as a generalization of the squared exponential function. $\Gamma(\cdot)$ is the gamma function and $K_a(\cdot)$ is the modified Bessel function of the second kind. This Kernel takes on different forms at different values of a. As a tends to infinity the Matérn kernel turns into the squared exponential kernel.

Common values of a are 3/2 and 5/2. Values of a where a=p+0.5 where $p \in \mathbb{N}$ makes the Matérn kernel a combination of an exponential and a polynomial function of order p. A property of this kernel function is that a GP expressed with this kernel is $\lceil a \rceil - 1$ times differentiable.

Kernel functions can be combined with each other to create different kernels. The choice of kernel is based on assumptions on how the underlying process should be structured. If a periodic behaviour is expected, then a periodic kernel would be a good choice. For the Matérn family of kernels, recall that they are parameterized by the choice of a, and common choices are a=p+0.5.

The value of p determines how fast the decay of covariance between different points should be. Choosing p=0, i.e. $\alpha=0.5$, means that points do not affect each other unless they are close. It is generally easier to make predictions from smoother functions. It is common in exploration-exploitation scenarios to use values of p that balance the generalization of more smooth functions, with the adaptability of more rugged functions. We are using a kernel function that belongs to the Matérn kernel functions as it has these properties. The exact choice of kernel function depends on how the assumed level of smoothness of the function is.

2.3 Acquisition Function

BO works by replacing the actual objective function with a surrogate function that is then fitted to data where the evaluated point and value at each evaluated point is known. Since the goal is to avoid evaluating at points where low reward is expected, randomly evaluating points to fit the GP is not advisable as it is not sample efficient.

BO uses an acquisition function to decide the sample points. These functions take a GP as input and provides one or several points of where to evaluate next. These recommended points are the locations of where, according to the GP, the acquisition function believes the probability of getting a better result than before is.

One such function is the Expected Improvement acquisition function. By using an acquisition function that suggests points where it is expected to obtain good performance, the method does its best to avoid evaluating in spaces of the domain where low return is expected. BO is an iterative approach. The Expected Improvement function is described as:

$$x_{eval} = \underset{x \in \mathbb{R}^N}{\text{argmax}} \, EI(x)$$

$$\text{where} \quad EI(x) = \begin{cases} (\mu(x) - \mu^+ - \epsilon)\Phi(Z) + \sigma(x)\varphi(Z) & \text{if } \sigma(x) > 0 \\ 0 & \text{if } \sigma(x) = 0 \end{cases}$$

$$\text{and} \quad Z = \frac{\mu(x) - \mu^+ - \epsilon}{\sigma(x)}$$

where $\mu(x)$ is the mean value for evaluations at point x, $\mu^+$ is the highest value evaluated so far, $\epsilon$ is a noise term to accommodate noisy evaluations, and $\sigma(x)$ is the standard deviation at point x, $\Phi$. $\Phi$ is the cumulative distribution function for $\mathcal{N}(0,1)$, where $\mathcal{N}$ is a gaussian distribution, and $\varphi$ is the corresponding probability density function. Since this expression is analytical, standard solvers such as the BFGS non-linear optimizer can be used to find the maxima.

2.4 BO Optimization Process

The BO optimization process is executed as follows:

1. Sample $N_{init}$ randomly sampled data points to initialize a posterior distribution.
2. Fit the GP to the $N_{init}$ sampled points.
3. Use Acquisition Function on the GP to find next point to evaluate.
4. Fit the GP to the previously sampled points and the new point.
5. Repeat from step 3 until a termination condition is met.

The termination condition is a design choice and problem dependent. It could be chosen as reaching a sufficient fitness score, if it is unknown as it is in our case it is chosen to be a combination of max number of allowed iterations and the difference in Euclidean distance in the domain of a series of successive evaluations to check for convergence. In this problem a real-world deployment approximation is used which is based on Offline RL policy evaluation. These could for example be evaluating through Direct Method (DM) evaluation or Inverse Propensity Scoring (IPS).

3. Offline Evaluation

In certain scenarios it is hard or impossible to evaluate an RL policy in the real-world environment. If there exist datasets containing interactions with different agents and the target environment, these can be used to estimate the value of the evaluated policy. One problem with using an offline dataset collected with a logging policy to evaluate a target policy is that the distribution of samples is different in the two cases. The logging and target policies will visit different states with different frequency. This causes problem unless it is accounted for.

There are different methods that can be used to correct for this. One of the most common methods is by Importance Weighting. IPS is based on importance weighting and aims to fix the issue of domain shift by assigning weights to the loss in evaluation examples. These weights are equal to quotient between the probability of the agent taking an action given a state and the probability of the same action being made in the same state in the source distribution. This method of evaluating across distributions is unbiased. It does however suffer from problems with variance in states where the source distribution is sampled less often.

FIG. 1 illustrates a wireless communications network 100 in which embodiments may be implemented, which network comprises a radio base station (RBS) 101 equipped with at least one tiltable antenna 102, and a group of wireless communication devices 103-107 served by the RBS 101. The wireless communication devices 103-107 are commonly referred to as User Equipment (UE). It is noted that in practice, an RBS may serve hundreds or even thousands of UEs.

In 3$^{rd}$ generation (3G) Universal Mobile Telecommunications System (UMTS), the RBS is typically referred to as a NodeB, in 4$^{th}$ generation (4G) Long Term Evolution, the RBS is typically referred to as an Evolved Node B (eNodeB), while in 5$^{th}$ generation (5G) New Radio (NR), the RBS is typically referred to as a gNodeB ("Next Generation NodeB").

The UEs may be embodied e.g. by smart phones, tablets, gaming consoles, connected vehicles, etc.

In the wireless communications network 100, antenna tilting is commonly used by the RBS 101 to change propagation of a main lobe of the antenna 102 either in an upwards or a downwards direction. This is performed in order to e.g. reduce interference or increase coverage in a specific area served by the antenna 102.

Mechanically tilting the antenna 102 thus changes coverage provided by the RBS 101 and must be carefully considered. In practice, the RBS 101 performs tilting of the antenna 102 relatively seldom, such as e.g. a couple of times every day, depending on how the UEs 103-107 are geographically deployed in a cell 108 served by the RBS 101.

It is thus desirable to find a model of how antenna tilting affects conditions of the cell 108, such that an informed decision can be made before the antenna tilting actually is performed. It is noted that in practice, antenna tilting is only performed if it is indicated to beneficial for a large group of UEs, and is not a decision taken on the basis of a few individual UEs. Therefore, careful consideration must be made before performing an antenna tilt.

Hence, the RBS 101 would benefit from having access to a model—created and trained by means of using machine learning (ML)—indicating how the conditions of the cell 108 are affected by antenna tilting. For instance, for a given number of UEs being located in the cell 108, it may be beneficial for the RBS 101 to be able to estimate—for different tilt angles of the antenna 102—Radio Resource Control (RRC) congestion rate, i.e. the relationship between number of RRC requests being rejected (due to the RBS 101 experiencing congestion and thus not having enough resources left to assign to a UE requesting a RRC connection) and the total number of RRC requests being made.

The RBS 101 would thus be able to estimate for a given number of UEs in the cell 108, or rather for a given range of UEs in the cell 108, which tilt angle to use in order to obtain a best possible RRC congestion rate.

Figure 2:
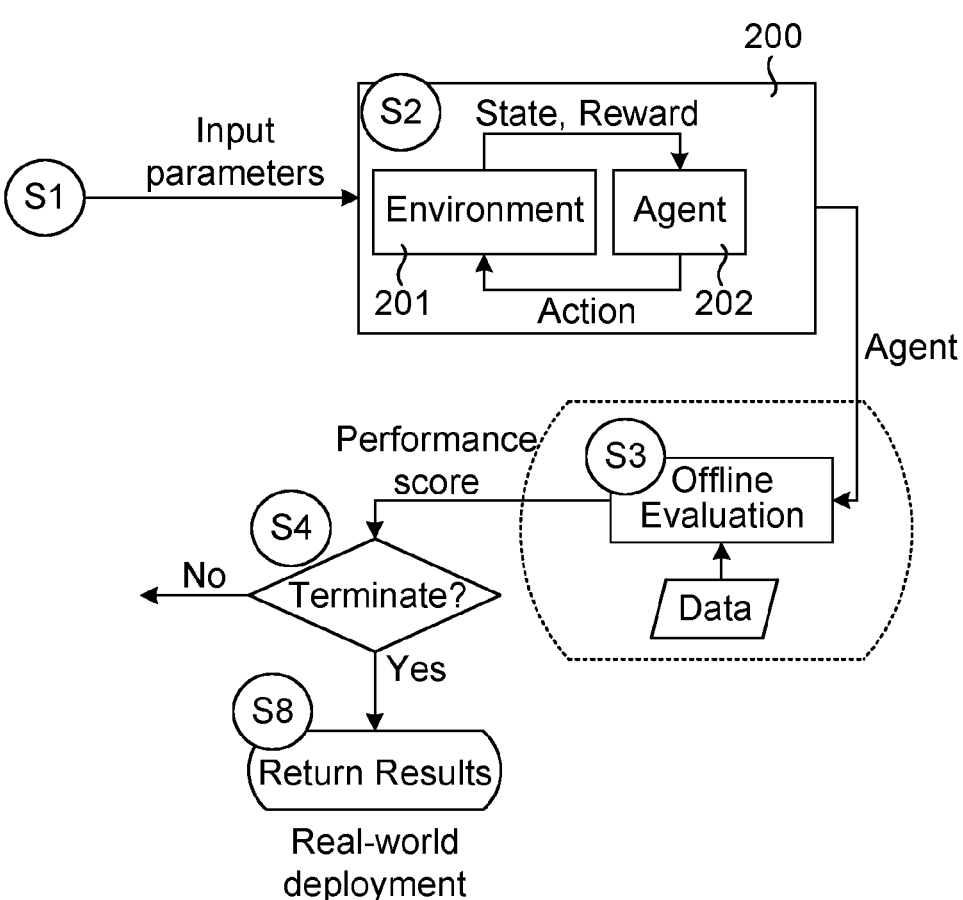
FIG. 2 functionally illustrates a process of creating and training an RL agent to be supplied to a radio base station for real-world deployment according to an embodiment.

FIG. 2 functionally illustrates a process of creating and training an RL agent 202 to be supplied to the RBS 101 according to an embodiment in order to enable for the RBS 101 to estimate different antenna tilt scenarios depending on conditions prevailing in the cell 108. The RBS 101 will thus advantageously be able to evaluate different scenarios utilizing the trained RL agent 202 and perform antenna tilting indicated by the trained RL agent 202 to be beneficial in terms of e.g. RRC congestion rate given the particular conditions prevailing in the cell 108.

It should be noted that process of FIG. 2 may be performed at any appropriate device such as at the RBS 101 itself, in a core network entity, in an Internet server, etc.

In a first step S1, one or more input parameters Φ, commonly referred to as population parameters, are selected for training the RL agent 202. In this exemplifying embodiment, the input parameter Φ selected is the number of UEs being served by the RBS 101 in the cell 108, but many other parameters may be envisaged such as ranges of antenna height for a plurality of sites, the distance between each site, cell carrier frequency, etc.

The number of UEs served in the cell 108 is in this case exemplified to vary between 50 and 1000 UEs, i.e. [(Φ$_{min}$, Φ$_{max}$]=[50, 1000]. In other words, the RBS 101 is estimated to serve 50 UEs as a minimum and 1000 UEs as a maximum depending on the time of day, which numbers typically are based on real-world observations. The RL agent 202 may thus be trained over this full range or alternatively over one or more selected sub-ranges within the full range.

Initially, a value range of the input parameter is selected and supplied to an RL process 200. For instance, values in the range [100, 200] is supplied to the RL process 200. This may be a random selection within the full range.

Now, the RL process 200 comprises a representation of an environment 201 of the RBS 101 to be trained by an agent 202 as illustrated in step S2. The RL agent 202 interacts with the environment 201 that is modelled as an MDP. As previously mentioned, the MDP is a 5-tuple described as $(\mathcal{S},\mathcal{A},\mathcal{P},\ \gamma,\ R).\ \mathcal{S}\in\mathbb{R}^{m}$, where m is the number of key performance indicators (KPIs) used to model the environment state. A KPI to be discussed in the exemplifying embodiment is, as discussed hereinabove, the RRC congestion rate, but numerous KPIs may be envisaged depending on the selected policy to be optimized, such as intra- or intercell interference, handover rate, Quality of Service (QoS), Reference Signal Received Quality (RSRQ), etc.

Thus, the values in the range [100, 200] will be supplied to the RL process 200 in step S1, thereby providing a range of representations of the environment 201 of the RBS 101. As is understood, a slightly different environment scenario is provided with each supplied value—each value indicating a particular number of UEs being served by the RBS 101 and thus a unique representation of the environment 201—and the RL agent 202 is trained for each provided environment within said range.

The environment 201 thus returns a reward for each value of the input parameter being supplied to the RL process 200 and the agent 202 will accordingly take appropriate action in terms of a selected antenna tilt to optimize the selected policy based on the returned rewards. In this example, the objective of the selected policy is to find an optimal RRC congestion rate.

As previously mentioned, the goal of the RL process 200 is to find a policy π that optimizes a value function. The value function is a mapping between the different states and the expected discounted sum of rewards, also known as the expected return. An optimal policy selects actions that lead to a state with the highest expected return. In this particular example, an antenna tilt resulting in an optimal RRC congestion rate is to be arrived at for the given value range [100, 200] of the inputted parameter "number of UEs in the cell served by the RBS".

The action set comprises three discrete actions, $\mathcal{A}\in\{$"uptilt", "no action", "downtilt"$\}$. These actions represent how the antenna 102 of the RBS 101 is tilted. The reward function is based on selected the KPIs and are used to find an optimal policy, in this example to find the optimal RRC congestion rate to be obtained in the cell 1*o*8 and thus a corresponding selected antenna tilt.

To conclude, in step S2, the RL agent 202 is trained using a range of representations of the environment 201 of the RBS 101, and actions taken by the RL agent 202 in the environment 201 to arrive at an optimal policy regarding a selected radio performance to be obtained for said environment, in this example an optimal RRC congestion rate, are based on selected tilt angles of the antenna 102 of the RBS 101 to obtain the estimated optimal RRC congestion rate in the cell 108.

Now, when the RL agent 202 has been trained such that an optimal RRC congestion rate is arrived at in step S2, the trained RL agent 202 is evaluated offline in step S3.

In other words, no real-world deployment of the trained RL agent 202 is performed at this stage in order to avoid previously discussed problems such as for instance unexpected real-world behaviour as a result of the trained RL agent 202 not having been trained for certain real-world scenarios.

In step S3, an offline evaluation of the trained RL agent 202 is performed using pre-recorded real-world data obtained from the RBS 101 to determine how well the RL agent 202 being trained during simulation in the RL process 200 actually complies with a real-world scenario. Thus, different pre-recorded real-world tilt angles of the antenna 102 and the resulting RRC congestion rates are evaluated for the trained RL agent 202 over the range of environments 201 stipulated by the values [100, 200] of the input parameter indicating number of UEs served in the cell 108.

In step S4, if from the offline evaluation in step S3 it is concluded the trained RL agent 202 indeed complies—at least to a sufficiently high degree—with the pre-recorded real-world data, the process terminates and the trained RL agent 202 along with the range of input parameter values [100, 200] over which it has been trained will be supplied to the RBS 101 thereby advantageously enabling a real-world deployment of the trained RL agent to be performed in step S8 in that the RBS 101 will utilize the trained RL agent 202 to determine which antenna tilt to perform under different conditions in order to achieve a desired RRC congestion rate.

In an embodiment, a performance score may be computed during the evaluation in step S3 indicating a measure of compliance of the trained RL agent with the pre-recorded real-world data. If in step S4 the computed performance score exceeds a compliance threshold value T, the trained RL agent 202 will be deployed at the RBS 101 in step S8. That is, a sufficiently high performance score (i.e. exceeding the compliance threshold T) indicates that the trained RL model indeed complies with the pre-recorded real-world data and thus may be safely deployed With reference to FIG. 3, in an embodiment, if it is determined in step S4 that the trained RL agent does not comply with the pre-recorded data of the offline evaluation in step S3 (i.e. if the computed performance score does not exceed T), the computed performance score is supplied along with the input parameter values [100, 200] representing the environments 201 for which the RL agent has been trained to a Bayesian optimization (BO) process 300 where in step S5 a gaussian process regression model is utilized to evaluate the range of representations of the environment of the RBS 101 for which the RL agent was trained in step S2, in order to find and select another range (i.e. number of UEs in this example) used to further train the RL agent in step S2 with the aim to arrive at a further trained RL agent that better complies with the pre-recorded real-world data when performing offline evaluation of the further trained RL agent in step S3.

A gaussian process regression model is a probabilistic model that aims to emulate an unknown function with a surrogate function. The surrogate function is based on pointwise evaluations across the domain, in this example stipulated by the range of UEs being served by the RBS 101 in the cell 108. The more evaluations that are made across the domain (where the full range of the domain is exemplified as [50, 1000] in the above) the more confident the predictions from the regression model will be. The confidence is regulated by the choice of a kernel function and is used to encode assumed prior knowledge about the shape of the function. This can for example be if a periodic behaviour or a specific shape of the function is expected, such as more jagged or smooth. In practice, fitting more datapoints to the model is what is done in step S5.

BO uses the gaussian process of step S5 to create suggestions of where the probability of finding a better score is the highest. For example, when the performance score found from range [100, 200] is added to the gaussian process, the BO method can suggest points that are closer to [100, 200] if the performance is better relative to other evaluations, e.g. range [150, 250], or further away if it is worse, e.g. range [300, 400]. As more evaluations are made, the closer new evaluations will be to a smaller region of the domain until a good prediction of the optima is made, ultimately resulting in a trained RL agent fully complying with the pre-recorded real-world data.

For instance, after some rounds of iteration in the BO process 300 and further training of the RL agent in step S2, the offline evaluation in step S3 may result in a conclusion in step S4 that a range of [300, 400] results in a trained RL agent complying best with the pre-recorded real-world data, and a real-world deployment of the further trained RL agent is performed in step S8 for the range [300, 400].

The way that new points are sampled in the BO process 300 is through an acquisition function. The acquisition function relates the uncertainty in the gaussian process model to the highest value so far to suggest new points. This suggestions of new points is what is performed in step S7. To be able to make good predictions, as in indicated in step S6, at least one evaluation across the domain should already have been made before using the acquisition function. Thus, to apply the acquisition function in step S7, of at least one iteration of RL agent training should have been performed.

In an embodiment, the range of representations [100, 200] of an environment 201 of the RBS 101 to be supplied in step S1 may initially be randomly selected from the full range [50, 1000] of representations.

Figure 3:
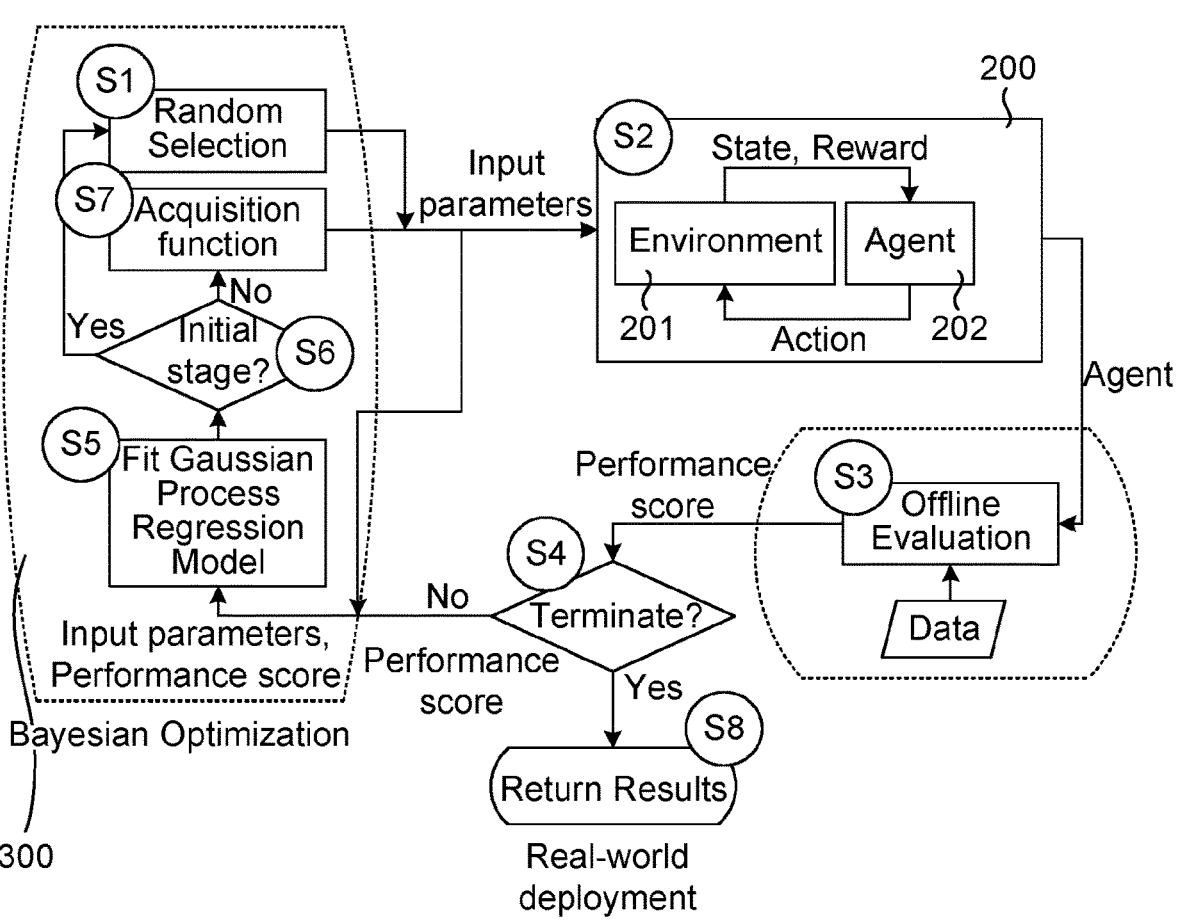
FIG. 3 functionally illustrates a process of creating and training an RL agent to be supplied to a radio base station for real-world deployment according to a further embodiment.

To conclude, actions performed in FIG. 3 comprises the following steps.

S1—random parameter selection: a random parameter $\Phi$ is sampled from the population parameters range $[(\Phi_{min}, \Phi_{max}]$. $\Phi$ parametrizes a distribution $\upsilon$ from which different environments are sampled, i.e., an environment $\xi$ is sampled as $\xi \sim \upsilon(\Phi)$. This set of environments is then used to train through DR.

S2—domain randomization training: given the range or set of environments, an RL agent is trained according to a DR process (desired hereinabove under 1.1), i.e. by maximizing the expected return across a set of environments sampled from $\upsilon$. The agent has model parameters that depend on the set of training environments denoted $\theta(\Phi)$.

S3—offline evaluation: the RL agent trained in the previous step is evaluated based on offline data as opposed to deploying the agent in the real world. An offline policy estimator is used to compute an agent performance score. This performance score can be of any type (e.g., sufficient policy value estimation, max number of iterations, or successive distance between evaluations), as the gaussian process component used is agnostic to which way the performance is measured.

S4—evaluate termination condition: a stopping rule of the training process. This could be done by stopping the training process after a given level of performance is achieved, if the evaluation is above a certain threshold number of iterations, or if a maximum number iterations are achieved.

S5—fit gaussian process: given the population parameters $\Phi$ and the performance score $J(\theta(\phi))$ the previous data D is amended with $D:=D\cup(\phi, J(\theta(\phi)))$ and the gaussian process regression model is fitted to the expanded set D. Fitting the data means that the distribution of functions which are sampled from the GP are conditioned of having to pass through the evaluated point. If the points of interest are known as X and the sampled points are known as Y, this is performed by first creating the joint distribution $$P_{X,Y} = \begin{bmatrix} X \\ Y \end{bmatrix} \sim \mathcal{N}\left(\begin{bmatrix} 0 \\ 0 \end{bmatrix}, \begin{bmatrix} K_{XX} & K_{XY} \\ K_{YX} & K_{YY} \end{bmatrix}\right)$$

where K is the covariance matrix created from the choice of kernel function. The interesting result comes from when the conditioned distribution $P_{X|Y}$ is created from this. The results are given as $$P_{X|Y} \sim \mathcal{N}\left(K_{YX}K_{XX}^{-1}X, K_{YY} - K_{YX}K_{XX}^{-1}K_{XY}\right).$$

This gives a distribution over which values the different points in X can assume. This works since gaussian form is assumed and conditioning one gaussian distribution creates a new gaussian distribution.

S6—sample next point: GPs require data D to create a model and there is a need to continuously sample new points. This step decides if the new point should be sampled randomly or by using the acquisition function. The acquisition needs a non-zero number of evaluations before it results in good predictions. Before that it is better to sample points at random. Such a decision rule is made as simple as if the size of the sampled points is below a threshold, i.e., $|D|<n$, where n is the required number of points.

S7—acquisition function: the acquisition function is used to sample where the probability of a new maxima is the highest. This is used to avoid evaluating parts of the domain where low return is expected. As the confidence in the model grows, the location of where the function evaluates should converge. The execution of the acquisition function is described under 2.3 hereinabove.

S8—return optimal randomization parameters: when the termination condition is met, the final step should be to return the area where the expected return is the highest. There are two ways to do this. This could either be done through using the acquisition function to sample a new set of environments which an agent should be trained on, or it could be done by returning the set of environments with the highest achieved performance score so far.

Figure 4:
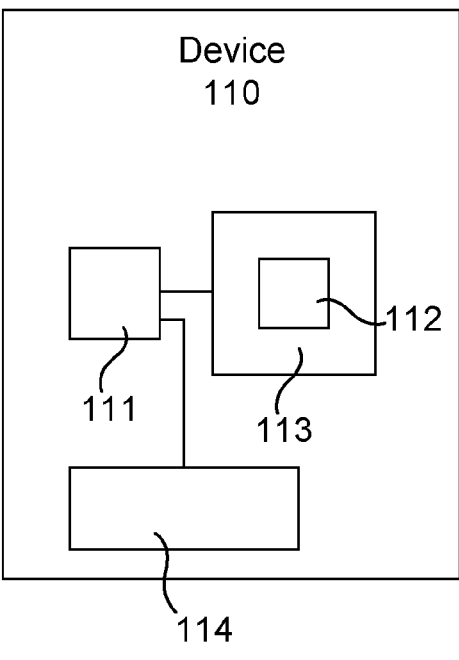
FIG. 4 illustrates a device configured to create and train an RL agent to be supplied to a radio base station for real-world deployment according to an embodiment.

FIG. 4 illustrates a device 110 configured to model an environment of an RBS 101 according to an embodiment, where the steps of the method performed by the device 110 in practice are performed by a processing unit 111 embodied in the form of one or more microprocessors arranged to execute a computer program 112 downloaded to a storage medium 113 associated with the microprocessor, such as a Random Access Memory (RAM), a Flash memory or a hard disk drive. The processing unit 111 is arranged to cause the device 110 to carry out the method according to embodiments when the appropriate computer program 112 comprising computer-executable instructions is downloaded to the storage medium 113 and executed by the processing unit 111. The storage medium 113 may also be a computer program product comprising the computer program 112. Alternatively, the computer program 112 may be transferred to the storage medium 113 by means of a suitable computer program product, such as a Digital Versatile Disc (DVD) or a memory stick. As a further alternative, the computer program 112 may be downloaded to the storage medium 113 over a network. The processing unit 111 may alternatively be embodied in the form of a digital signal processor (DSP), an application specific integrated circuit (ASIC), a field-programmable gate array (FPGA), a complex programmable logic device (CPLD), etc. The device 110 further comprises a communication interface 114 (wired or wireless) over which the device 110 configured to transmit and receive data.

The device 110 of FIG. 4 may be provided as a standalone device or as a part of at least one further device. For example, the device 110 may be provided in a node of a core network, or in an appropriate device of a radio access network (RAN), such as in the RBS 101 itself, in an internet server, etc. Alternatively, functionality of the device 110 may be distributed between at least two devices, or nodes. These at least two nodes, or devices, may either be part of the same network part (such as the core network) or may be spread between at least two such network parts. In general terms, instructions that are required to be performed in real time may be performed in a device, or node, operatively closer to a radio cell than instructions that are not required to be performed in real time.

Thus, a first portion of the instructions performed by the device 110 may be executed in a first device, and a second portion of the of the instructions performed by the device 110 may be executed in a second device; the herein disclosed embodiments are not limited to any particular number of devices on which the instructions performed by the device 110 may be executed.

Hence, the method according to the herein disclosed embodiments are suitable to be performed by a device 110 residing in a cloud computational environment. Therefore, although a single processing circuitry in is illustrated in FIG. 4, the processing circuitry in may be distributed among a plurality of devices, or nodes. The same applies to the computer program 112. Embodiments may be entirely implemented in a virtualized environment.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of modelling an environment of a radio base station, comprising:

training a reinforcement learning, RL, agent using a range of representations of an environment of a radio base station, wherein actions taken by the RL agent in the environment to arrive at a policy regarding a radio performance to be obtained for said environment are based on selected tilt angles of at least one antenna of the radio base station;

performing an offline evaluation of the trained RL agent using pre-recorded real-world data representing the selected tilt angles and the corresponding obtained radio performance over said range of representations of the environment;

determining, from the offline evaluation, if the trained RL agent complies with the pre-recorded real-world data;

if it is determined from the offline evaluation that the trained RL agent complies with the pre-recorded real-world data, performing a real-world deployment of the trained RL agent for said range of representations of the environment; and if it is determined from the offline evaluation that the trained RL agent does not comply with the pre-recorded real-world data:

performing a Bayesian optimization process on said range of representations of an environment of the radio base station in order to find a different range of representations where the trained RL agent is estimated to better comply with the pre-recorded real-world data; and further training the RL agent using said different range of representations to arrive at a further trained RL agent determined to better comply with the pre-recorded real-world data based on the performed offline evaluation.

2. The method of claim 1, the performing of an offline evaluation further comprising:

computing a performance score indicating a measure of compliance of the trained RL agent with the pre-recorded real-world data; and the determining if the trained RL agent complies with the pre-recorded real-world data further comprises:

determining if the trained RL agent complies with the pre-recorded real-world data, and if the trained RL agent complies with the pre-recorded real-world data, performing the real-world deployment of the trained RL agent.

3. The method of claim 1, wherein the range of representations of an environment of the radio base station initially is randomly selected from a full range of representations.

4. The method of claim 1, the performing of a Bayesian optimization process comprising:

evaluating said range of representations of an environment of the radio base station in a gaussian process regression model in order to find a different range of representations where the trained RL agent is estimated to better comply with the pre-recorded real-world data.

5. The method of claim 4, further comprising:

applying an acquisition function to the data evaluated in the gaussian process regression model in order to find said different range of representations where the trained RL agent is estimated to better comply with the pre-recorded real-world data, the acquisition function determining said different range of representations such that a range is avoided where low reinforcement learning return is expected.

6. The method of claim 4, wherein the acquisition function only is applied to evaluated data being a result of at least one iteration of RL agent training.

7. A device configured to model an environment of a radio base station, said device comprising a processing unit and a memory, said memory containing instructions executable by said processing unit, whereby the device is operative to:

train a reinforcement learning, RL, agent using a range of representations of an environment of a radio base station, wherein actions taken by the RL agent in the environment to arrive at a policy regarding a radio performance to be obtained for said environment are based on selected tilt angles of at least one antenna of the radio base station;

perform an offline evaluation of the trained RL agent using pre-recorded real-world data representing the selected tilt angles and the corresponding obtained radio performance over said range of representations of the environment;

determine, from the offline evaluation, if the trained RL agent complies with the pre-recorded real-world data;

if it is determined from the offline evaluation that the trained RL agent complies with the pre-recorded real-world data, perform a real-world deployment of the trained RL agent for said range of representations of the environment; and if it is determined from the offline evaluation that the trained RL agent does not comply with the pre-recorded real-world data:

perform a Bayesian optimization process on said range of representations of an environment of the radio base station in order to find a different range of representations where the trained RL agent is estimated to better comply with the pre-recorded real-world data; and further train the RL agent using said different range of representations to arrive at a further trained RL agent determined to better comply with the pre-recorded real-world data based on the performed offline evaluation.

8. The device of claim 7, further being operative to, when performing an offline evaluation:

compute a performance score indicating a measure of compliance of the trained RL agent with the pre-recorded real-world data; and when determining if the trained RL agent complies with the pre-recorded real-world data:

determine if the computed performance score exceeds a compliance threshold value, and if the computed performance score exceeds the compliance threshold value, performing the real-world deployment of the trained RL agent.

9. The device of claim 7, further being operative to, when performing a Bayesian optimization process:

evaluate said range of representations of an environment of the radio base station in a gaussian process regression model in order to find a different range of representations where the trained RL agent is estimated to better comply with the pre-recorded real-world data.

10. The device of claim 9, further being operative to:

apply an acquisition function to the data evaluated in the gaussian process regression model in order to find said different range of representations where the trained RL agent is estimated to better comply with the pre-recorded real-world data, the acquisition function determining said different range of representations such that a range is avoided where low reinforcement learning return is expected.

11. The device of claim 10, further being operative to apply the acquisition function only to evaluated data being a result of at least one iteration of RL agent training.

12. The device of claim 7, further being operative to initially select the range of representations of an environment of the radio base station randomly from a full range of representations.

* * * * *